United States Patent [19]

Norgren et al.

[11] 4,394,734
[45] Jul. 19, 1983

[54] PROGRAMMABLE PERIPHERAL PROCESSING CONTROLLER

[75] Inventors: Kent S. Norgren, Longmont; Robert E. Vogelsberg, Boulder, both of Colo.

[73] Assignee: International Business Machines Corp., Armonk, N.Y.

[21] Appl. No.: 220,636

[22] Filed: Dec. 29, 1980

[51] Int. Cl.³ ............................................. G06F 13/00
[52] U.S. Cl. ............................................. 364/200
[58] Field of Search ... 364/200 MS File, 900 MS File

[56] References Cited

U.S. PATENT DOCUMENTS

| | | | |
|---|---|---|---|
| 3,302,180 | 1/1967 | Donohoe et al. | 364/900 |
| 3,362,015 | 1/1968 | Mackie et al. | 364/200 |
| 3,500,466 | 3/1970 | Carleton | 364/200 |
| 3,558,811 | 1/1971 | Montevecchio et al. | 178/6 |
| 3,560,937 | 2/1971 | Fischer | 340/172.5 |
| 3,751,582 | 8/1973 | Wernikoff et al. | 178/6 |
| 3,909,799 | 9/1975 | Recks et al. | 340/172.5 |
| 3,914,537 | 10/1975 | Perreault et al. | 178/6 |
| 4,067,059 | 1/1978 | Derchak | 364/200 |
| 4,156,798 | 5/1979 | Doelz | 179/15 |
| 4,188,668 | 2/1980 | Finlay | 364/900 |

Primary Examiner—Harvey E. Springborn
Attorney, Agent, or Firm—Homer L. Knearl

[57] ABSTRACT

A peripheral processing controller controls access to a peripheral memory by specialized peripheral devices. The specialized peripheral devices process all of the data independently of a central processor that simply supervises the system. The controller uses Memory Address Registers (MARs) to control the access to the memory by the peripheral devices. Each peripheral device selects a MAR, and each MAR includes a mode register. The start address and mode are set in each MAR by the supervising central processor. Also, each peripheral device is set by the processor to select a MAR. When the controller grants each peripheral device access to the peripheral memory, the peripheral device uses whatever mode and starting address has been initialized for the MAR selected by the device. Each time the device accesses the memory, the address in the MAR is incremented so the MAR is ready for the next access. In this way, a peripheral device will advance through a block of memory space. The mode is used to specify the end-of-block (EOB) condition for the block of memory space that the peripheral device is working with. The EOB may be based on the number of accesses by a device to the memory or it may be based on particular memory addresses.

11 Claims, 8 Drawing Figures

FIG. I

PROGRAMMABLE PERIPHERAL PROCESSING CONTROLLER

DESCRIPTION

1. Field of the Invention

This invention relates to data processing systems where large quantities of data from peripheral devices must be processed. In particular it relates to controlling the access of specialized peripheral devices to a memory shared by the peripheral devices. Depending upon the data processing function desired the access to the memory requires different storage map patterns in the memory. One technical area where the invention has particular applicability is processing data in a document distribution system.

2. Background Art and Related Applications

In document distribution systems, the document to be transmitted is converted to millions of data bits per page. Document distribution systems may use coded information (CI) or non-coded information (NCI) to electronically transmit the document image. Whether the data is CI or NCI, it must be processed before it is transmitted. Data processing may include data compression to reduce transmission time and data encryption for security purposes. Processing millions of data bits with a single processor to achieve these functions is wasteful and time-consumming.

It is much more efficient to use specialized peripheral devices working in parallel to perform the scan, compress, encrypt, transmit, receive, decrypt, decompress and print operations. An example of such a system is described in copending commonly-assigned patent application, Ser. No. 220,637, filed Dec. 29, 1980, entitled Shared Peripheral Processing System by K. A. Bushaw et al.

The apparatus shown in the Bushaw et al application uses a peripheral processing controller to control the access of the peripheral devices to the memory they share. Further there are two embodiments of the inventive system in the Bushaw et al application and each embodiment uses a different peripheral processing controller. One of these controllers is the subject of the present invention. The other controller is the subject of copending commonly-assigned patent application Ser. No. 241,902, filed Mar. 9, 1981, entitled Mode Selectable Peripheral Processing Controller.

In the Mode Selectable Peripheral Processing Controller, the memory blocks, which are accessed, have a predetermined size. Each mode has a predetermined operation with a predetermined MAR (Memory Address Register) to provide a particular memory access function for the selected peripheral device working with the memory. The system works well but in effect each peripheral device is locked into a particular mode of memory access.

SUMMARY OF THE INVENTION

It is the object of this invention to permit each peripheral device to have any pattern of memory space allocation in the memory space accessed for each peripheral device by the peripheral processing controller.

In accordance with this invention the above object is accomplished by having each peripheral device set to select its MAR (Memory Address Register). Each MAR includes a mode register. Initially, the start address and mode are set in each MAR. Also, each peripheral device is set to select a MAR. When the controller then grants each peripheral device access to the peripheral processing memory, the peripheral device uses whatever mode and starting address has been initialized in the MAR selected by the device.

Further, the mode is used to specify the end of block condition for the block of memory that the peripheral device is working with. The EOB (end of block) may be based on the number of accesses by a device to the memory since its MAR was initialized or it may be based on particular memory addresses. Thus, the block size, that a peripheral device works with, is controlled by the number of accesses or the start address relative to an end address.

The great advantage of this invention is that it frees each peripheral device from being tied to a particular pattern of memory space allocation in the peripheral processing memory. Now each peripheral device may use the memory space in any manner as needed by having a supervisory system, initialize each device to select a MAR and initialize the MARs in the peripheral processing controller to different modes and starting addresses.

DETAILED DESCRIPTION

Figure 1:
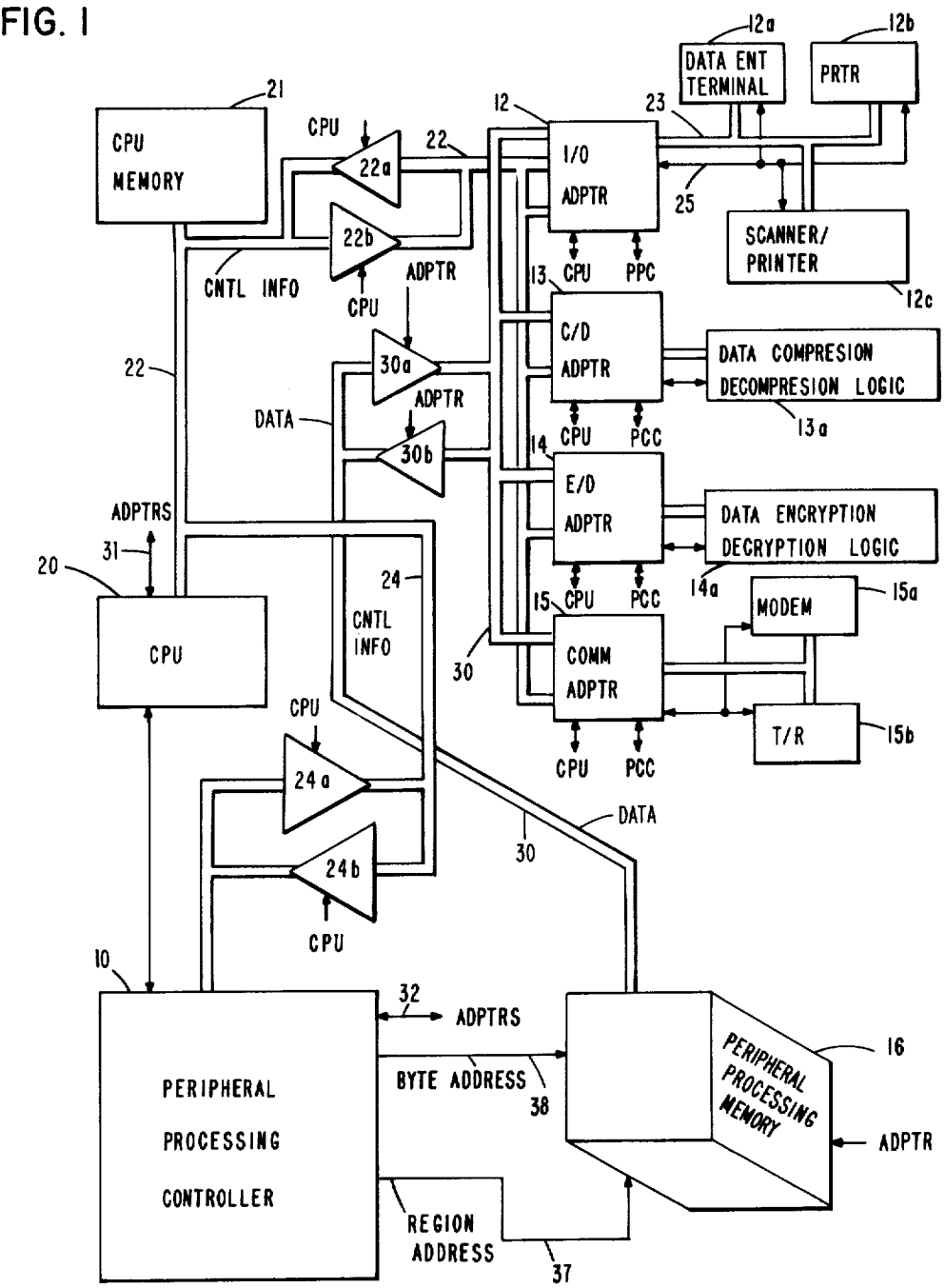
FIG. 1 shows the system environment of the present invention where data processing is entirely accomplished by peripheral devices working with a peripheral processing memory under control of the peripheral processing controller.

In FIG. 1, controller 10 and peripheral adapters 12, 13, 14, and 15 are initialized by Central Processing Unit (CPU) 20. Thereafter, adapters 12–15 with their peripheral devices (indicated by the same reference numeral as the adapters except for letter suffixes) operate simultaneously to process data directly with the peripheral processing memory 16. Controller 10 contains a plurality of memory address registers (MAR's), end-of-block logic and priority logic for controlling shared use of peripheral memory 16 by devices 12a–c, 13a, 14a, 15a–b.

Central processing unit (CPU) 20 with its memory 21 supervises the operation of the system. It does not directly process the data in the peripheral system. The CPU sends and receives control information to and from the peripheral adapters over bidirectional bus 22 using drivers 22a and 22b to steer the control information flow. Similarly, CPU 20 sends and receives control information to and from peripheral processing controller 10 over bidirectional bus 24 using drivers 24a and 24b to steer the control information flow. The control information includes address data, status information, commands, control bits, mode information, etc; it does not include data processed by the peripheral devices 12a–c, 13a, 14a and 15a–b.

In FIG. 1 the control buses 22 and 24 and data bus 30 represent information channels which are address controlled. The single lines represent hardwired control or address lines and may represent more than one such line. For example, CPU 20 can send control information to controller 10 or adapters 12–15 over buses 22 and 24 by addressing the information to registers in the controller or the adapters. The single line 32 between controller 10 and the adapters (ADPTRS) represent multiple signal lines such as request, grant and end-of-block. Similarly address lines 37 and 38 are multiple address lines.

In operation, CPU 20 responds to interrupts from the peripheral devices. Using control bus 24 and signal lines 31, CPU 20 sets up MARs in controller 10 with start addresses for a peripheral data processing job. Based on the job to be performed, each device uses a preassigned MAR or is assigned a MAR by CPU 20 over control bus 22. Then CPU 20 releases the peripheral adapters and their peripheral devices to perform their assigned peripheral jobs.

When each peripheral device is ready to process data it requests via a signal line 32 that controller 10 grant it access to peripheral memory 16. Controller 10 grants it access based on predetermined priority logic in the controller. The grant commands are passed back to the peripheral adapters over signal lines 32.

If a peripheral device is granted access, it sends a MAR select and enable signal over lines 32 to activate its assigned MAR in controller 10. Also, it sends a Read/Write command to drivers 30a and 30b and to peripheral processing memory 16 to steer the data flow over data bus 30 from or to memory 16. The peripheral device having access then reads or writes data in peripheral memory 16 over data bus 30.

Figure 2:
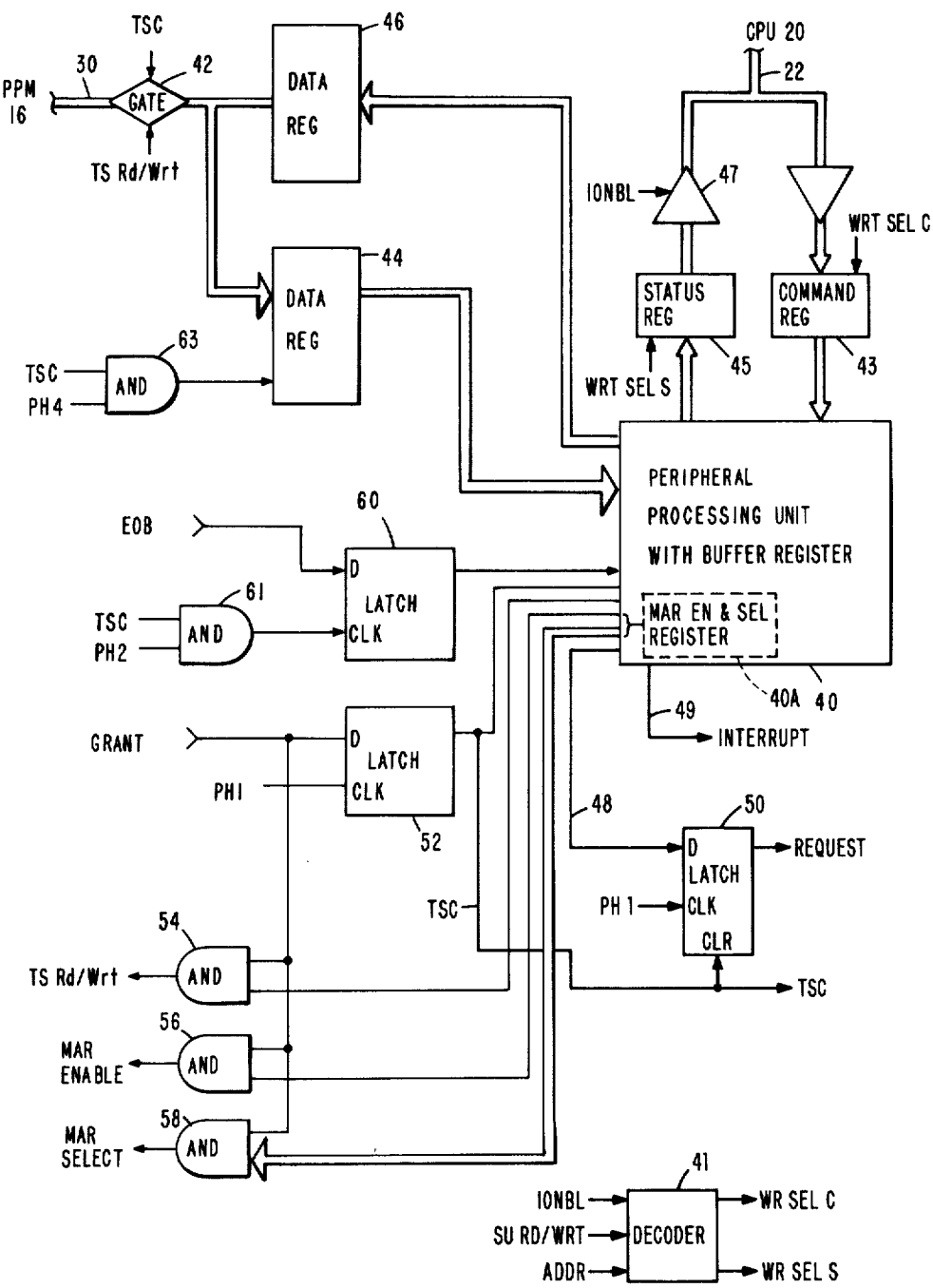
FIG. 2 shows one of the adapters in FIG. 1 with its peripheral device (peripheral processing unit).

The peripheral device is assigned a MAR by having its MAR Enable and select register 40A (inside the device) initialized by CPU 20 through command register 43 (FIG. 2). The assigned MAR contains the address of the data in peripheral memory 16 that is to be processed by the peripheral device. The address consists of two portions, a region address and a byte address. The region address is passed by region address lines 37 to PPM peripheral processing memory 16. The byte address is passed by lines 38 and identifies the specific storage location within a region of memory that contains the byte of data to be accessed by the peripheral device.

Each peripheral device processes the data in memory at the address provided by its assigned MAR. Each time a device 12a–c, 13a, 14a, 15a or 15b accesses the memory, the address in its MAR is incremented by one so that the device may work its way through a block of data stored in peripheral processing memory 16. After each access, the requesting device with the highest priority is granted the next access by the controller. A peripheral device will keep requesting access to PPM 16 until it gets enough data to process. Thus, the peripheral devices are processing data simultaneously within themselves and are time-sharing access to PPM 16.

The addressing of a block of data in memory 16 is monitored by end-of-block logic in controller 10 so that it knows when a peripheral device has finished processing its assigned data block. The end-of-block conditions are loaded into the controller 10 over the control bus 24 by CPU 20 when the peripheral device job is initialized. The conditions may be the size of the block or the number of accesses by a given peripheral device. When controller 10 detects the end-of-block, it notifies the peripheral adapter with an EOB command. The peripheral device in turn sends an interrupt to CPU 20. This tells the CPU that the peripheral device has completed its assigned job. Alternatively, if initialized to do so, the peripheral device may simply proceed to another job.

The shared peripheral-processing system shown in FIG. 1 is a document distribution system. Input/Output adapter 12 connects a data entry module 12a, a printer module 12b or a scanner/printer module 12c to the the system. Bus 23 carries the video data and control commands. Signal lines 25 are hardwired and carry control signals between the modules and the I/O adapter. Each of the modules preferably contain a microprocessor to supervise the print, scan or data entry function. Data entry refers to such functions as card reading, tape reading, optical character reading or keyboard data entry.

The C/D adapter 13 connects data compression or decompression logic 13a to the system. Similarly, E/D adapter 14 connects data encryption or decryption logic 14a to the facsimile system. The compression or encryption functions may be accomplished with any number of algorithms using hardwired logic or microprocessors.

The communication adapter 15 connects the system to one of several communication links. The communication links are represented by modem 15a and transmitter/receiver (T/R) 15b. Typically the modem will be used to communicate over telephone lines while the transceiver might be used in a satellite communication network.

When initializing this shared peripheral-processing system, CPU 20 can configure the facsimile system to perform multiple peripheral jobs. For example, the system can be initialized in one configuration as a scanner, data compressor, data encryptor, and data transmitter. Then facsimile scan data will be processed through peripheral memory 16 in pipeline fashion. In another configuration, the system can be initialized as a receiver, data decryptor, data decompressor and printer. In this configuration facsimile print data is processed through peripheral memory 16 in pipeline fashion.

Referring now to FIG. 2, a general schematic showing the preferred configuration of a peripheral adapter is shown. The peripheral device or processing unit 40 and its included buffer registers are not shown in detail. The processing unit would assume different configurations depending upon the peripheral function to be performed. For example, in FIG. 2 represented the scanner/printer peripheral adapter 12 of FIG. 1, then the peripheral processing unit would have to contain a scanning mechanism, logic to process the scan data, and buffer storage to buffer the data until it was ready for transmission to the peripheral processing memory 16 of FIG. 1. Also, the unit 40 if representative of the scanner/printer device 12c would have to include a paper handling mechanism and a printing mechanism plus the buffer storage for print data and print data processing electronics to drive the print head.

If the peripheral processing unit 40 represented the compressor/decompressor 13a or the encryptor/decryptor 14a, it would simply consist of logic with buffer storage sufficient to store the quantity of video data being compressed/decompressed or encrypted/decrypted. Similarly, if peripheral processing unit 40 represented the transmitter/receiver 15 of FIG. 1, it would have to include a modulation/demodulation device to transmit or receive data as well as logic and buffer storage to organize the data for transmission/reception.

Thus, FIG. 2 generally represents any type of adapter in FIG. 1 and describes how such a peripheral adapter is attached to the system of FIG. 1. Control data from CPU 20 goes directly to the peripheral processing unit 40 over the bus 22. When the CPU wishes to send control information to the processing unit 40, it sends a supervisory read/write signal (Su Rd/Wrt) and the address of the adapter's command register 43 to the adapter. Decoder 41 in the adapter responds to the address and the Su Rd/Wrt signal and generates the write select C signal (WRT SEL C). This signal enables command register 43 to receive and store the control information over bus 22.

When CPU 20 wishes to check the status of the peripheral processing unit (PPU) 40, it addresses status register 45. The CPU sends decoder 41 a IONBL signal, a Su Rd signal and the address of the status register 45 at the adapter. Decoder 41 generates the Wrt Sel S signal to gate status information from the PPU 40 into status register 45. The IONBL signal then gates driver 47 to pass the information in status register 45 back to CPU 20.

If the PPU wishes to contact the CPU 20, it sends an interrupt signal over signal line 49. The CPU will check the contents of status register 45, as described above, looking for an interrupt status bit. If the bit is present, it confirms that the device was the source of the interrupt signal.

The above described flow of information to PPU 40 has been control information. Data to be processed comes from the peripheral processing memory PPM 16 over bus 30 through bi-directional driver gate 42. Data read from the memory is stored in register 44 before it is loaded into the peripheral processing unit 40. Data to be written into the peripheral memory 16 is stored in data register 46 while it waits to be gated to the memory 16. Gate 42 is controlled by the TS Read/Write command and by the time share cycle (TSC) signal which enables the gate 42.

After peripheral processing unit 40 has been initialized by commands from CPU 20 over bus 22, the first operation is to request access to memory 16. Processing unit 40 when it wishes access, generates a request signal on line 48 to latch 50. At the next PH1 clock signal, latch 50 is set. Its output is the request signal sent over one of the signal lines 32 (FIG. 1) to the peripheral processing controller 10.

Figure 3A:
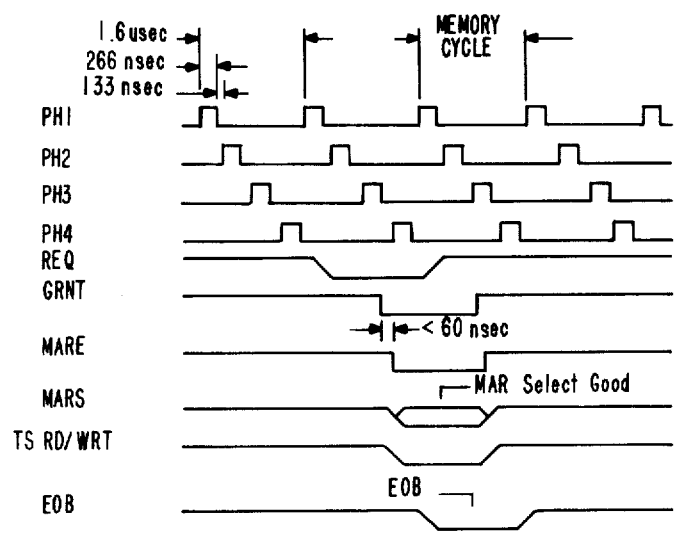
FIGS. 3A and 3B show the timing of signals used in the system.
Figure 3B:
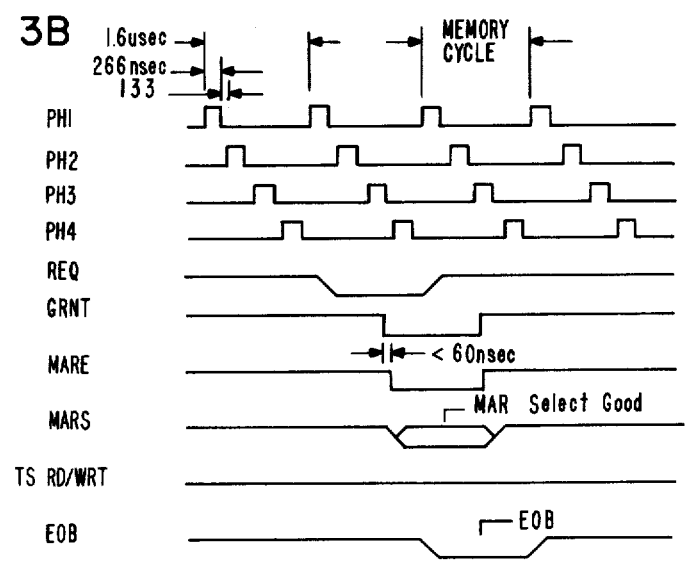

The signals used in FIG. 2 are diagrammed in FIGS. 3A and 3B. FIG. 3A shows a typical write operation, while FIG. 3B shows a read operation. The clock signals have four phases, PH1 through PH4.

A single memory cycle is measured from the rising edge of a PH 1 clock pulse to the rising edge of the next PH 1 clock pulse. The presence of a request signal out of latch 50 is shown in FIG. 3A as a pulse REQ that shifts from a higher level to a lower level starting at one PH1 clock pulse time and terminating at the next PH1 clock pulse time.

Figure 6:
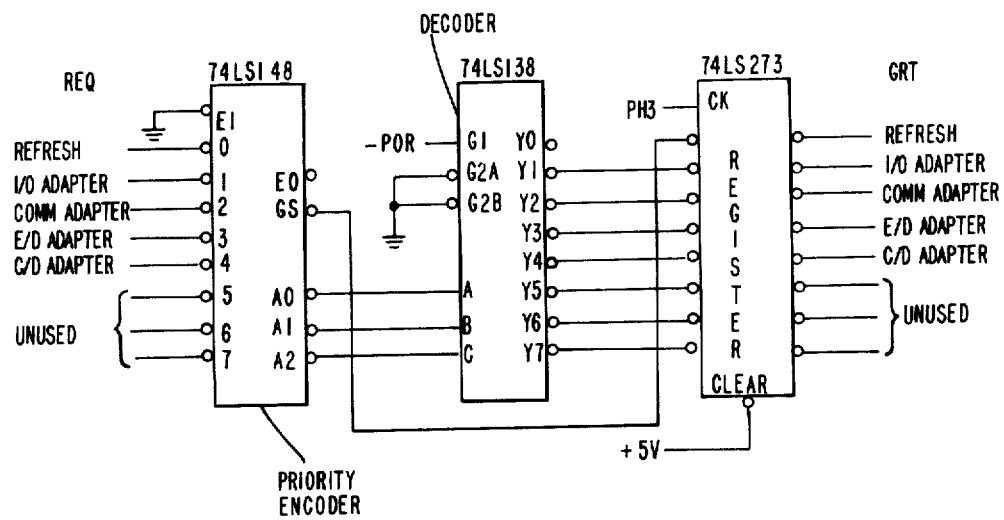
FIG. 6 shows the priority circuits in the peripheral processing controller which respond to requests from the peripheral devices and generate grants of access to the peripheral processing memory.

As shown in FIG. 6, the grant signal, received back from the peripheral processing controller 10 (FIG. 1), is generated at PH3 time. The grant signal stays on until the next PH3 clock pulse. The circuit modules in FIG. 6 are available from Texas Instruments as part numbers 74LS148, 74LS138 and 74LS273. Module 74LS148 is a priority encoder and will have a 3 bit output on lines A0, A1 and A2 representative of the highest priority of the 0–7 inputs. The highest priority is assigned to input 0 and descends to the lowest priority being assigned to input 7. The three bit output is the binary representation of the input line with the highest assigned priority that has a request signal present.

For example, if inputs 1, 2 and 4 have a request signal present, the output on A0, A1 and A2 is 001. If requests had been present on inputs 3 and 4, the output would be 011 for input 3.

Decoder 74LS138 simply converts the 3 bit word from encoder 74LS148 back into a single line output. In other words only one of the lines Y0–Y7 has a signal output depending upon the 3 bit word input from A0, A1 and A2. The G1, G2A and G2B inputs are enabling inputs. So long as there is no power-on-reset signal on G1, and inputs G2A and G2B are grounded, decoder 74LS138 is enabled.

The one line of Y0–Y7 that has an output will set its associated stage in register module 74LS273 at PH3 clock time. The clear input to the module is held at +5 volts to enable the register. If the +5 volts is not present, the register is cleared. The stage, that is set at PH3 clock time, has a grant output that is sent back to its associated adapter or to the memory refresh apparatus (not shown). At the next clock cycle the PH3 pulse will reset that stage in the register unless the priority encoder and decoder modules still indicate that same request represents the highest priority request.

In FIG. 2, the grant signal is received by the latch 52. Latch 52 will set at PH1 time when the grant pulse is present. The output of latch 52 is the time shared cycle (TSC) signal. The TSC signal enables gate 42 to connect the data bus 30 to the data registers 44 and 46 and clears the request latch 50. The TSC signal also notifies the processing unit 40 that the request for access has been granted.

When peripheral processing unit 40 activates its request signal, it generates the Read/Write signal which is applied to AND gate 54. The peripheral processing unit 40 also generates of a MAR Enable signal and a MAR Select signal. These signals are applied to AND gates 56 and 58, respectively. AND gates 54, 56 and 58 are all enabled by the grant signal received back from the peripheral processing controller 10 (FIG. 1).

MAR Enable and MAR Select signals are passed to the processing controller 10 in FIG. 1. The TS Read/Write signal from AND gate 54 is used to steer data through the gate 42 (FIG. 2), drivers 30A and 30B (FIG. 1), and to control the Read/Write function of peripheral processing memory 16.

If the operation is a Write operation, then the TS Read/Write signal will be a negative-going pulse remaining active as long as the grant signal is active (see FIG. 3A). During this Write pulse, data flows from data register 46 through gate 42 and through driver 30B (FIG. 1) to PPM 16.

The process of request, grant, MAR select and memory addressing continues until the peripheral processing controller 10 in FIG. 1 indicates the end of a block of data has been reached. At that time, the controller 10 generates the EOB (end-of-block) signal which is received in FIG. 2 by latch 60. When the EOB signal is present, the latch is set by the PH 2 signal passed by AND 61. AND 61 is enabled during the time share cycle by the TSC signal. The set condition of latch 60 signals peripheral processing unit 40 that end-of-block has been reached. The latch is reset at the next PH 2 clock signal.

Figure 4:
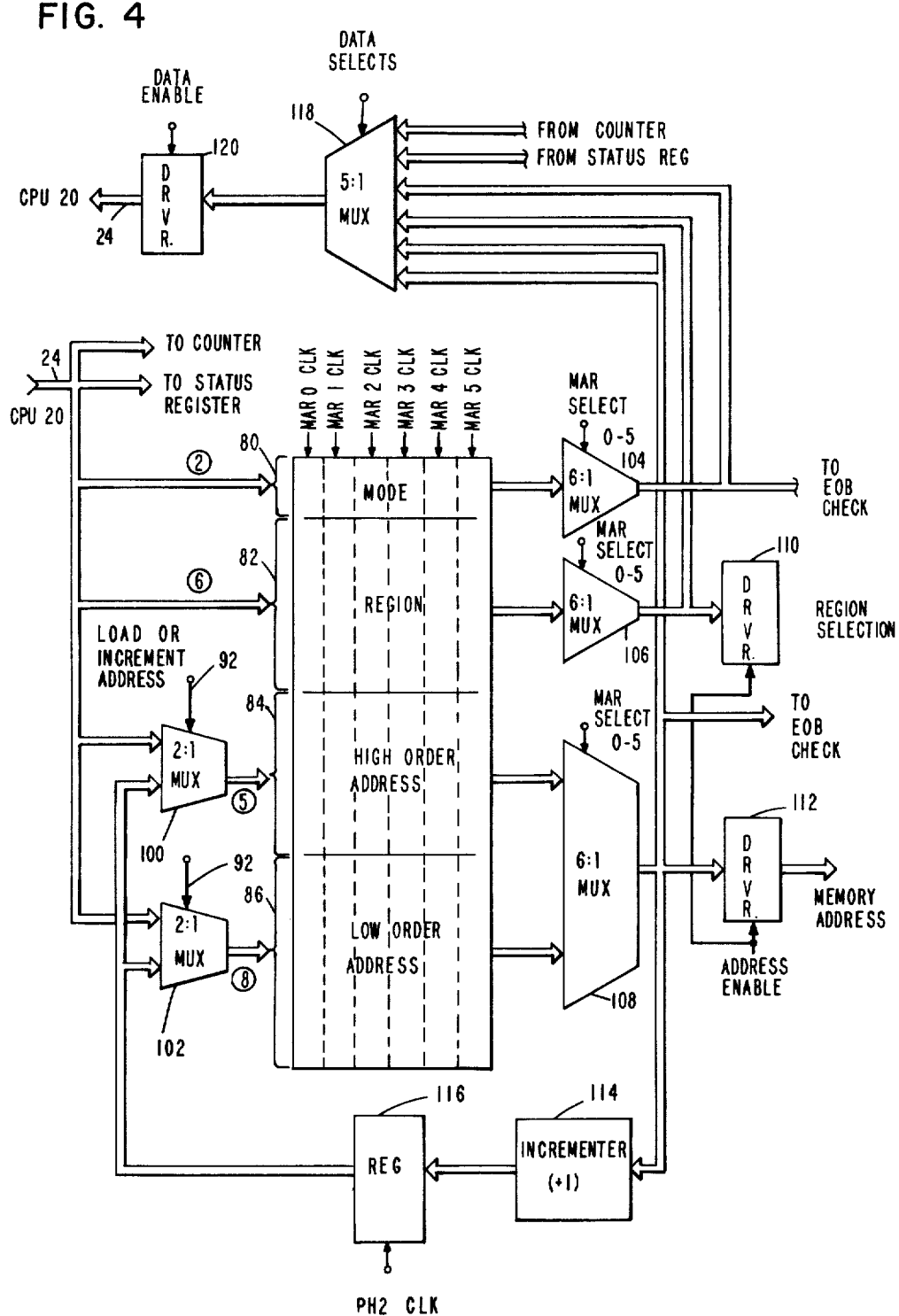
FIG. 4 shows the portion of the peripheral processing controller containing the MAR's.
Figure 5:
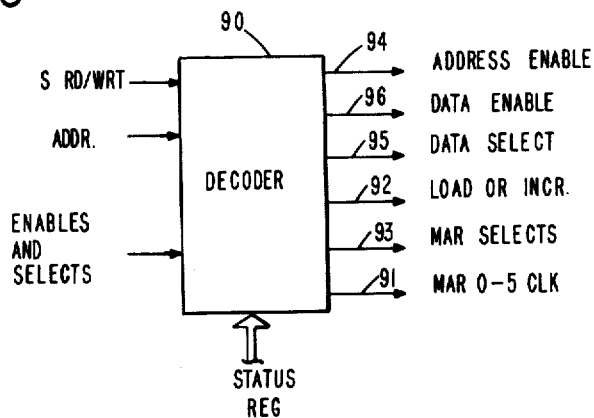
FIG. 5 shows the command decoder in the peripheral processing controller which decodes commands from the supervisory CPU.
Figure 7:
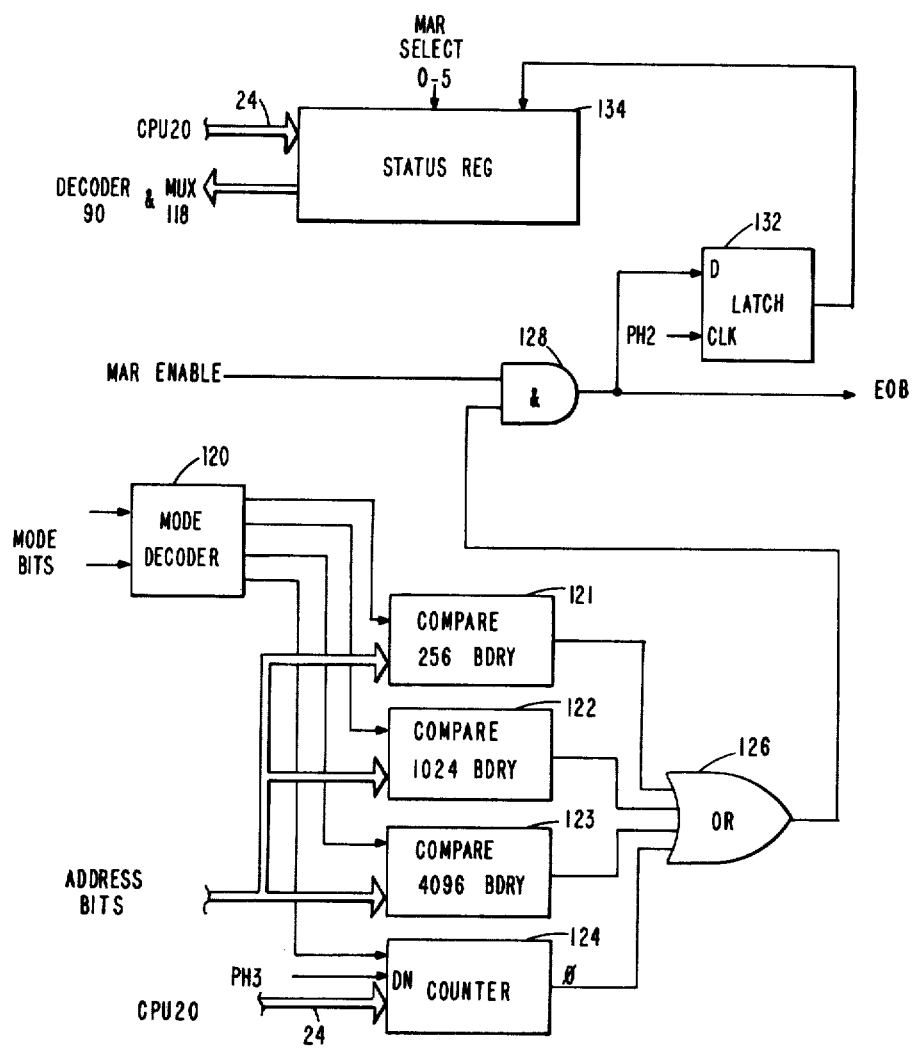
FIG. 7 shows the end-of-block detection apparatus in the peripheral processing controller.

The peripheral processing controller 10 of FIG. 1 is shown in detail in FIGS. 4, 5, 6, and 7. FIG. 4 shows the memory address registers (MARS) and the multiplex switches for gating address and mode information in and out of the MAR's. FIG. 5 shows the decoder that decodes the commands from the CPU or the addresses from the enable and select lines from the peripheral adapters. The decoder generates the commands used throughout the peripheral processing controller. FIG. 6 shows the priority modules which receive requests and issue grants. FIG. 7 shows the end-of-block apparatus that generates the EOB signal which is sent back to the peripheral adapter.

As shown in FIG. 4, the memory address registers (MARs) are divided into four sections, mode 80, region 82, high-order address bits 84, and low-order address bits 86. There are six MARs, MAR0 through MAR5. The mode, region, high-order address, and low-order address sections contain 2, 6, 5 and 8 bits, respectively. In effect, there are six memory address registers each containing 21 bits, two mode bits, six region bits, and thirteen address bits. These MARs are initialized by CPU 20 loading in bytes of control and address information over control bus 24.

The first byte of eight bits is loaded into the mode and region sections of the MAR addressed by CPU 20. Which MAR is addressed is decoded by decoder 90 in FIG. 5. The decoder 90 will respond to an address signal over bus 24 from CPU 20 and generate a MAR 0–5 Clock signal 91 which will select one of the MARs 0–5. Accordingly, the first byte of eight bits is loaded into the register sections 80 and 82 because the CPU sends an address command to decoder 90 in FIG. 5 that causes the decoder to generate one of the MAR 0–5 Clock signals. Five of the eight bits in the second byte are similarly loaded into the MAR section 84. These bits are the high-order address bits specifying an address in peripheral processing memory 16. Finally, the third byte is loaded into the MAR section 86. The third byte contains the low-order eight bits specifying an address in PPM 16. In this way, CPU 20 initializes the six MARs by addressing each MAR, which address is decoded into a MAR clock signal, and loading three bytes of address and control data over bus 24.

For the second and third bytes which contain the high-order and low-order address bits, the CPU 20 must also send a load command. Decoder 90 will then generate the load command over line 92 so that the multiplexers 100 and 102 will pass the bits of the address bytes to the MAR sections 84 and 86. As discussed hereinafter, multiplexers 100 and 102 may be switched to the increment address mode by the CPU 20 after the MAR groups 84 and 86 have been initialized. The increment mode is used to increment the address bits each time a peripheral device is given access. Thus, after initialization, the peripheral devices will work their way through a block of data as addressed by the incremented addresses in the MAR sections 84 and 86.

After all of the MARs have been initialized, and the MAR Enable and Select register 40A (FIG. 2) in each peripheral device has been initialized, CPU 20 signals each peripheral processing unit (PPU) 40 to begin its job. Each PPU requests access. If its request is granted, peripheral processing unit 40 then sends out the MAR Enable signal and the MAR Select signal from register 40A to the controller 10 (FIG. 1). Decoder 90 in FIG. 5 is inside the controller 10 and decodes the enable and select signal to generate the MAR Select 0–5 signal 93. Each peripheral device, after being initialized, selects its assigned MAR in this manner.

The MAR Select 0–5 signal gates the multiplexing switches 104, 106 and 108. Multiplexing switch 106 passes the region address to the peripheral processing memory 16 (FIG. 1). Multiplexor 108 passes the high and low order address bits to the peripheral processing memory. The region selection and address bits go to the memory when the drivers 110 and 112 are enabled by the decoder 90 in FIG. 5. Decoder 90 generates the address enable signal 94 in response to the enable and select signals from the peripheral device.

At the same time that the address bits are supplied to the peripheral processing memory, they are also fed back to the incrementer 114. Incrementer 114 adds one to the address. At Ph 2 clock time the incremented address is then stored in register 116. When the increment address signal 92 comes from the decoder 90, the incremented address in register 116 is stored back into sections 84 and 86 of the selected MAR. In this way, the address in a MAR is advanced by one to the next address position each time the peripheral device accesses the memory.

Also shown in FIG. 4, is the multiplexing switch 118 and the driver 120. Multiplexing switch 118 and driver 120 are controlled by the decoder in FIG. 5 in response to commands from the CPU 20. When CPU 20 wishes to check the status of the MARs, it sends a command to the controller which is decoded by decoder 90 (FIG. 5). Decoder 90 generates a Data Select signal 95 to switch multiplexer 118 and a Data Enable signal 96 to activate driver 120. The selected data is gated through the multiplexing switch 118 and is driven by driver 120 on to bus 24 back to the CPU.

The only remaining function in the controller 10 (FIG. 1) is the end-of-block (EOB) detection. This apparatus is shown in FIG. 7. The end-of-block checking apparatus has four different modes of operation. The mode bits stored in the MAR register group 80 in FIG. 4 control the mode of operation of the end-of-block checking apparatus. When a selected MAR is read out through the multiplexers 104, 106 and 108 in FIG. 4, the two mode bits from that MAR are passed to the mode decoder 120 in FIG. 7. Decoder 120 decodes the two bits into one of four possible mode conditions and enables one of the comparators 121 through 123 or counter 124.

The comparators 121 through 123 also receive the low order address bits from the selected MAR. From these address bits, these comparators look for a boundary condition indicating the end of a block of data in memory.

Comparator 121 looks for an address position 255. Comparators 122 and 123 look for address positions 1,023 and 4,095 respectively. These comparators are monitoring the lowest order address bits for an all ones condition. Comparator 121 looks for the eight lowest order bits to be all ones; comparator 122 looks for the ten lowest order bits to be all ones; and comparator 123 looks for the twelve lowest order bits to be all ones. When a MAR is selected and its mode bits enable one of the comparators 121 through 123, that comparator will check to see if the MAR is addressing the boundary condition that the comparator is looking for. If it is, an end-of-block (EOB) signal from the selected comparator is passed by OR 126 to AND gate 128.

The fourth mode that the end-of-block apparatus may use is to count the number of accesses to the memory. If the MAR has mode bits indicating this mode, then counter 124 is enabled by the decoder 120 each time that MAR is selected during a memory access cycle. Counter 124 is loaded by CPU 20 over bus 24 with a count specifying the number of accesses necessary to process a data block. At the same time, the MAR would be set up by the CPU 20 with the initial address starting the block. Each time the MAR using this fourth mode is selected, the mode decoder 120 in FIG. 7 will enable the counter 124 to receive a PH 3 clock pulse to count the counter down. When the counter 124 is counted down to zero, the end of the block condition has been reached. The zero condition from counter 124 is collected by OR 126 and passed to AND 128.

The end-of-block condition out of OR 126 is passed by AND gate 128 after MAR Enable is active. There will be a MAR Enable during each time share access.

If there is an end-of-block condition detected during the period when the MAR Enable signal is active, then the EOB signal is sent to the peripheral adapters. Then the peripheral device having access detects the EOB signal.

The end-of-block signal is also used to set latch 132. Latch 132 is set at PH 2 clock pulse time when the EOB signal is present. Latch 132, in turn, loads an EOB bit condition into the status register 134. Each stage of the register 134 is associated with one of the six MARs in FIG. 4. Accordingly, if an end-of-block condition is detected for that MAR, an EOB bit is loaded into that stage of the status register 134 associated with the MAR.

When a stage of the status register 134 is set, it indicates to the decoder 90 in FIG. 5 that a particular MAR has reached an end-of-block condition. The decoder inhibits the selection of that MAR thereafter until the MAR is again initialized and the status register stage for that MAR is reset by CPU 20.

While we have illustrated and described the preferred embodiment of our invention, it is understood that we do not limit ourselves to the precise constructions herein disclosed and the right is reserved to all changes and modifications coming within the scope of the invention as defined in the appended claims.

What is claimed is:

1. In a peripheral processing system having a central processor for supervising the system, a plurality of peripheral devices, a peripheral memory, said devices for processing data with the peripheral memory independent of the central processor, control apparatus for controlling access of the peripheral devices to the peripheral memory comprising:
    a plurality of memory address registers, each register selected by one of the peripheral devices,
    a plurality of mode registers, each mode register selected by one of the peripheral devices,
    said memory address registers being initialized to a starting address by said central processor;
    said mode registers being initialized to one of a plurality of end-of-block modes by said central processor, each mode defining an end-of-block condition for a block of memory space;
    means for accessing the peripheral memory with an access address corresponding to the starting address from the memory address register selected by a peripheral device, said accessing means advancing said access address to access memory space as said selecting peripheral device processes data;
    end-of-block detection means, responsive to the mode in said selected mode register, for detecting when said access address has reached the end-of-block condition defined by the mode in said selected mode register;
    means, responsive to the end-of-block condition detected by said detecting means, for inhibiting said accessing means whereby the mode in said selected mode register controls when the selecting peripheral device has completed access to a block of memory space.

2. The apparatus of claim 1 and in addition:
    register select means in said peripheral devices initialized by said central processor so that each peripheral device is set by said central processor to select a memory address register and a mode register.

3. The apparatus of claim 2 wherein said means for detecting comprises:
    means for comparing said access address used by said accessing means with an address boundary;
    means responsive to the mode in said selected mode register for selecting the address boundary used by said comparing means;
    said comparing means indicating an end-of-block condition when said access address from said accessing means reaches the selected address boundary.

4. The apparatus of claim 2 wherein said means for detecting comprises:
    a plurality of comparing means, each comparing means for comparing said access address used by said accessing means with an address boundary associated with one of the end-of-block modes;
    means responsive to the mode in said selected mode register for enabling the comparing means having the address boundary corresponding to the end-of-block mode in said selected mode register;
    the enabled comparing means indicating an end-of-block condition when said access address from said accessing means reaches the address boundary used by the enabled comparing means.

5. The apparatus of claim 2 wherein said detecting means comprises:
    means for counting the number of accesses by the selecting peripheral device to said memory;
    said counting means indicating an end-of-block condition when said counting means reaches a predetermined count.

6. The apparatus of claim 5 wherein:
    said counting means is initialized by the central processing unit to a count equal to the number of bytes in the data block to be processed by the selecting peripheral device and said counting means indicates an end-of-block condition upon reaching a count of zero.

7. The apparatus of claim 2 wherein said means for detecting comprises:
    means for comparing said access address used by said accessing means with a predetermined address boundary;
    said comparing means, if enabled, generating an end-of-block condition when said access address from said accessing means reaches the selected address boundary;

means for counting the number of accesses by the peripheral device to said memory;

said counting means, if enabled, indicating an end-of-block condition when said counting means reaches a predetermined count;

means responsive to the mode in said selected mode register for enabling either said comparing means or said counting means to indicate the end-of-block condition corresponding to the end-of-block mode in said selected mode register.

8. A peripheral processing controller in a system having a plurality of peripheral devices, said devices processing data directly with a memory and independently of a central processor, said controller providing access from each peripheral device to the memory in multiple modes of memory space allocation and comprising:

a plurality of memory address registers, each register selectable by each of the peripheral devices and containing the first access address and the mode of memory space allocation for the selecting peripheral device;

said memory address registers being initialized to the first access address and a memory space mode by said central processor;

means for accessing space in the memory with the first access address from one of said memory address registers and advancing the access address through memory space as the peripheral device selecting that register processes data with the memory;

detection means, enabled by the memory space mode from the register selected by the peripheral device processing data with the memory, for detecting when the memory space, allocated in accordance with the memory space mode in the selected register, has been consumed by the peripheral device.

9. The apparatus of claim 8 and in addition:

register select means in each of said peripheral devices initialized by said central processor to select a memory address register and thereby to select a first access address and a memory space mode for each of said peripheral devices.

10. The apparatus of claim 9 wherein said detecting means comprises:

a plurality of memory space comparing means, each comparing means for comparing the space used in accessing the memory with the memory space allocation represented by one of the memory space modes;

decode means for decoding the memory space mode from the memory address register selected by the register select means of the peripheral device processing data with the memory and for enabling the one comparing means for that memory space mode;

said enabled comparing means indicating when the memory space used by the selecting peripheral device equals the space allocated to the device.

11. The apparatus of claim 10 and in addition said detecting means further comprises:

means for counting the number of accesses by the selecting peripheral device to said memory;

said decode means decoding the mode in the selected register and enabling said counting means instead of one of said comparing means;

said enabled counting means indicating the selecting peripheral device has consumed all the space allocated when said counting means reaches a predetermined count.

* * * * *